United States Patent [19]

Zimmer

[11] 4,438,309

[45] Mar. 20, 1984

[54] TOOL HOLDER FOR MANIPULATOR ARM

[75] Inventor: Ernst Zimmer, Friedberg, Fed. Rep. of Germany

[73] Assignee: Kuka Schweissanlagen & Roboter GmbH, Augsburg, Fed. Rep. of Germany

[21] Appl. No.: 343,262

[22] Filed: Jan. 27, 1982

[30] Foreign Application Priority Data

Feb. 12, 1981 [DE] Fed. Rep. of Germany ....... 3105105

[51] Int. Cl.³ ............................................ B23K 11/28
[52] U.S. Cl. ................................ 219/86.7; 219/86.25; 339/8 R
[58] Field of Search ...................... 219/80, 86.1, 86.25, 219/86.31, 86.9, 86.7, 125.1, 727, 125.11, 125.12; 339/5 R, 5 M, 5 P, 6 R, 8 R; 414/744 R, 735; 228/45

[56] References Cited

U.S. PATENT DOCUMENTS 2,341,459  2/1944  Martin .
2,879,490  3/1959  Campbell et al. .
3,399,289  8/1968  Skiaky .......................... 219/86.31 X
4,022,518  5/1977  Gattaz ................... 339/8 R
4,348,575  9/1982  Hedrén et al. ................. 219/86.1 X

FOREIGN PATENT DOCUMENTS 2416536  9/1977  Fed. Rep. of Germany .

Primary Examiner—B. A. Reynolds
Assistant Examiner—Catherine M. Sigda
Attorney, Agent, or Firm—Karl F. Ross; Herbert Dubno

[57] ABSTRACT

A tool holder for a manipulator comprises a tool shaft extending along and rotatable about a main axis and having a tool-shaft end provided with a pivot defining a transverse axis. A tool is carried on the pivot and is displaceable relative to the tool shaft about the transverse axis. A stack of guide rings coaxially surrounds the tool shaft adjacent the pivot and is formed with at least two throughgoing guide-ring passages each having a radially outwardly opening passage end. Two of the guide rings define a pair of axially spaced annular confronting guide-ring surfaces. A connector ring is rotatable on the stack between the guide-ring surfaces and has a pair of axially oppositely directed connector-ring surfaces one of which axially directly confronts one of the guide-ring surfaces. A connector element secures the connector ring to the tool-shaft end for joint rotation of same about the main axis. A flat contact element is secured to one of the one surfaces and is axially flatly engageable with the other of the one surfaces. Thus current can be transmitted between the connector ring and the guide ring of the one guide-ring surface by the contact element. A piston-and-cylinder assembly and a spring are engaged between the connector ring and the other of the guide-ring surfaces for pressing the one surface and contact element together axially. An electrical feed line is connected to the conductor fixed to the support and an electrical line is connected between the other conductor and the tool for feeding electricity through to the tool.

14 Claims, 4 Drawing Figures

TOOL HOLDER FOR MANIPULATOR ARM

FIELD OF THE INVENTION

The present invention relates to a tool holder for a manipulator arm. More particularly this invention concerns such a tool holder that is used on a robot welder.

BACKGROUND OF THE INVENTION

A tool holder for a manipulator is known which comprises a tool shaft extending along and rotatable about a main axis and having a tool-shaft end provided with a pivot defining a transverse axis. A tool is carried on the pivot and is displaceable relative to the tool shaft about the transverse axis. A support adjacent the tool carries one of a pair of mutually engageable conductors, the other of which is fixed on the tool-shaft end so as to be movable therewith. An electrical feed line is connected to the conductor fixed to the support and means including an electrical line is connected between the other conductor and the tool for feeding electricity through to the tool.

It is known from German patent document 2,416,536 to use a semicylindrical contact shoe centered on the main axis and surrounded by angularly extending flexible commutators which are tensioned radially in against an outer surface of the contact shoe. It is also known from U.S. Pat. No. 2,879,490 to employ a pair of contact shoes that are biased radially inwardly against a cylindrical outer conductor surface by powerful radially extending screws. Another system seen in U.S. Pat. No. 2,341,459 has two relatively rotatable conductors with axially confronting and abutting faces which are biased axially together by springs and the force of a pneumatic cylinder to form a good electrical connection.

In addition it is frequently desired to make fluid connections to the tool, which frequently itself has to be cooled, or to a fluid cylinder in the tool for minor displacements of the tool. This is particularly the case with tong-type pinch welders and the like. As the tool is frequently rotated a full 360° to make an annular weld seam, it is necessary to provide complex fluid lines. These even further complicate the problem of conducting electricity through the holder.

OBJECTS OF THE INVENTION

It is therefore an object of the present invention to provide an improved tool holder for a manipulator.

Another object is the provision of such a tool holder for a manipulator which overcomes the above-given disadvantages.

A further object is such a tool holder which comprises a few basic elements that can be assembled together to meet the requirements of all types of tools, from simple ones needing nothing more than one electrical and two fluid—that is hydraulic or pneumatic—connections, to more complex ones needing two electrical and four fluid connections.

SUMMARY OF THE INVENTION

These objects are attained according to the instant invention in a holder of the above-described general type, but which has a stack of guide rings coaxially surrounding the tool shaft adjacent the pivot and formed with at least two throughgoing guide-ring passages each having a radially outwardly opening passage end. Two of the guide rings define a pair of axially spaced annular confronting guide-ring surfaces. A connector ring is rotatable on the stack between the guide-ring surfaces and has a pair of axially oppositely directed connector-ring surfaces one of which axially directly confronts one of the guide-ring surfaces. Connector means secures the connector ring to the tool-shaft end for joint rotation of same about the main axis. A flat contact element is secured to one of the one surfaces and is axially flatly engageable with the other of the one surfaces. Thus current can be transmitted between the connector ring and the guide ring of the one guide-ring surface by the contact element. Means including a piston-and-cylinder assembly and a spring is engaged between the connector ring and the other of the guide-ring surfaces for pressing the one surfaces and contact element together axially.

The advantage of this system is that a part which is fixed to the input side and a part which is fixed on the output side of the holder, but rotatable relative to the input-side part are used to conduct electricity and, if desired, fluids through the holder to the tool. The use of a stack of rings makes it possible, as will be explained further below, to increase the connections through the holder with ease.

According to this invention the guide rings are formed with complementary coaxially centered formations fitting into one another, whereby the stack forms a tube around the tool shaft. Thus they will be perfectly concentric and axially fixed with respect to one another.

In accordance with another feature of this invention the piston-and-cylinder arrangement includes an annular cylinder ring secured to one of the guide rings and forming the other of the guide-ring surfaces and an annular piston axially displaceable in the cylinder ring. Such arrangement is almost foolproof and allows considerable force to be brought to bear for best electrical contact. This piston-and-cylinder assembly is braced axially between the connector rings.

In a system where the tool requires two electrical feeds, the holder further comprises a second such connector ring axially sandwiched with the first-mentioned connector ring between the guide-ring surfaces, a second such flat contact element between the guide ring of the other of the one guide-ring surfaces and the confronting surface of the second such connector ring and secured to one of same, a second such electrical conductor connected to the guide ring of the other guide-ring surface and a second such electrical line connected between the second connector ring and the tool, and a second such connector means for securing the second connector ring to the tool-shaft end for joint rotation with same about the main axis. Thus it is possible to use a two-part tool for pinch or spot welding.

The flat contact element according to this invention is formed by an annulus of angularly spaced conductive contact segments separated by axially open gaps. Thus any foreign matter that finds its way in between the contact-element face and the ring face it axially flatly abuts will be scraped from the contact segments into the gaps. The contact element segments are each at least one terminal-silver plate having a planar face and soldered to the one of the one surfaces.

According to this invention at least some of the guide rings are of light metal with hard insulating coatings. Thus even though all of these rings are rigid metal elements, they can be axially bolted together without fear of their shorting out. It is possible to take the assembly according to this invention apart relatively easily when the guide ring of the one guide-ring surface has inner and outer parts interengaging each other by a screwthread for limited axial displacement of the outer part on the inner part. The outer part can therefore be screwed up to clamp the assembly axially together, to which end it normally comes into flat contact with a shoulder of the inner part that defines its end position.

When according to this invention when the tool requires two fluid feeds the holder further comprises a second such connector ring axially sandwiched with the first-mentioned connector ring between the guide-ring surfaces. In this case the stack is formed with another two throughgoing guide-ring passages each having a passage end opening radially outwardly level with the second connector ring and the second connector ring is formed with connector-ring passages radially aligned with the other two guide-ring passages. This holder further has a second such connector means for securing the second connector ring to the tool-shaft end for joint rotation with same about the main axis, and means including fluid lines connected between all four of the connector-ring passages and the tool for feeding respective fluids through the connector rings to the tool. Thus with this system a tool that is carried on a double-acting cylinder can have two connections for this cylinder and two for circulating coolant through the tool. In this case the connector-ring passages include radially inwardly open guide grooves aligned with the respective passage ends.

It is also possible according to this invention for the one surfaces to be axially spaced and have chamfered outer edges. The holder further comprises an O-ring engaging radially inwardly against the chamfered edges. In this manner dirt is prevented from entering this gap between these one surfaces in a manner which offers virtually no resistance to relative rotation of the two parts it engages, while permitting limited relative axial motion between these parts.

DESCRIPTION OF THE DRAWING

The above and other features and advantages will become more readily apparent from the following, reference being made to the accompanying drawing in which.

SPECIFIC DESCRIPTION

Figure 1:
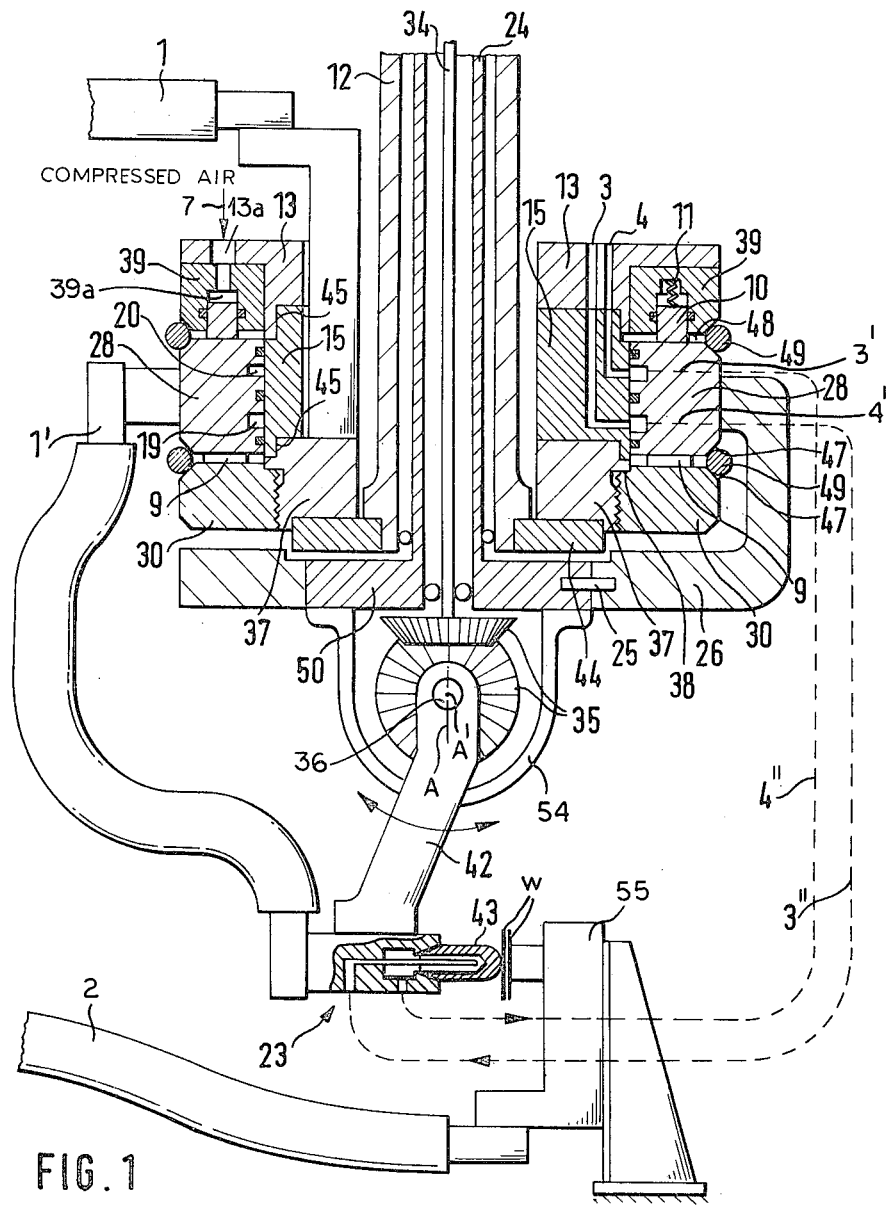
FIG. 1 is an axial section through the apparatus according to the present invention.

As seen in FIG. 1 a welding tool 23 is carried at the outer end of an arm 42 carried on an axle 36 centered on an axis A' and journaled in cheeks 54 carried on a flange 50 formed at the end of a tube shaft 24 extending centered on an axis A perpendicular to the axis A'. A shaft 34 coaxially through the center of this tube shaft 24 carries a bevel gear 35 meshing with another bevel gear 35 fixed on the axle 36. Thus joint rotation of the shafts 24 and 34 about the axis A will rotate the welding tool 23, here constituted by a hollow coolable electrode 43, about the axis A; relative rotation of the shafts 24 and 34 about the axis A will displace this tool 23 angularly about the axis A'. This style of movement is similar to that described in my U.S. Pat. No. 4,290,239. The illustrated assembly is normally carried at the end of a manipulator arm of the type described in that patent or in my copending U.S. patent application Ser. Nos. 267,756 filed May 28, 1981 (now U.S. Pat. No. 4,399,718) or 326,762 filed Dec. 2, 1981.

The assembly of this invention has an outer support tube shaft 12 centered on the axis A and carrying at its lower end a fixed ring 44 to which is in turn fixed an externally threaded support ring 37. An intermediate guide ring 15 is fixed atop this ring 37, and another guide ring 13 is fixed atop its, with shoulders 45 on the rings 37 and 15 centering the rings 15 and 13, respectively. Thus the tube shaft 12, ring 50, ring 37, ring 15, and ring 13 are all fixed relative to each other, effectively forming a tube centered on the axis A. This assembly can simply be the last element or "wrist" of a manipulator arm. The upper ring 13 is of L-section and has an axially opening port 13a to which compressed air can be fed through a line indicated schematically at 7.

Threaded up against a shoulder 38 of the lower guide ring 37 is a ring 30 to which in turn is soldered a plurality of flat contact elements 9 of so-called terminal silver. This ring 30 is in excellent electrical contact with the lower ring 37 which in turn is connected to an electrical feed wire 1. Another feed wire 2 of opposite polarity is connected to a support 55 on which workpieces W to be welded are carried. At least the rings 15 and 44 are of aluminum with hard anodized insulating coatings, so that the rings 30 and 37 are electrically isolated from the rest of the structure. Similarly making the rings 13 of hard-coated aluminum or light metal also can avoid the possibility of an electrical connection at a fluid line.

Rotatable on the ring 15 is another ring 28 having a flat bottom surface engageable flatly with the contact segments 9 and a flat top surface engaging the face of a piston 10 which is axially displaceable in a cylinder groove 39a of a ring 39 engaged under the radial leg of the L-section ring 13. Springs 11 urge the piston 10 axially downwardly into engagement with the top surface of the ring 28 to press it down against the segments 9. In addition compressed air fed in through the port 13a in the ring 13 can pressurize the groove 39a above the annular piston 10 to press it down with considerable force, thereby forcing the ring 28 into excellent electrical contact with the contact segments 9. The rings 28, 30, and 39 are spaced apart by gaps 48 and have chamfered edges 47 in which O-ring type seals 49 are provided to keep foreign matter out of the assembly.

A flexible heavy-duty cable 1' is connected at one end to the ring 28 and at the other end to the electrode 43 so that current can flow from the line 1 through the rings 37 and 30, contact segments 9, ring 28, and wire 1' to the electrode 43. The flexibility of the wire 1' allows the tool 23 to move about the axis A' relative to the ring 28. Obviously the electrode 43 is insulated in a conventional manner from the rest of the assembly. An entrainment element or arm 26 is fixed at one end to the ring 28 and at its other end via a key 25 to the flange 50, which key 25 allows limited relative displacement between the flange 50 and ring 28. In this manner the ring 28 rotates jointly with the flange 50 and shaft 24.

The rings 13 and 15 are formed with passages 3 and 4 opening axially upwardly and radially outwardly at radially spaced locations. Respective radially inwardly open grooves 19 and 20 are formed in the ring 28 aligned with the radially outwardly open ends of the passages 3 and 4. In turn passages 3' and 4' and flexible lines 3" and 4" lead from these grooves 19 and 20 to the coolable electrode 43. Thus a coolant fed into the upper end of the passage 3 will pass radially out through the groove 19 to the passage 3' and line 3" to the electrode 43 to cool it, then will return via the line 4''', the passage 4', the groove 20, and the passage 4. This flow is possible in any angular position of the ring 28 relative to the rings 15 and 13.

With the system according to the instant invention air pressure need only be applied through the line 7 to the piston 10 when electricity is to pass between the cables 1 and 1'. Thus if the welder is only used when it is stationary, the joints and bearings can be relieved of the axial load created by the piston 10 in the assembly as it is moved from place to place. The cylinder 39a above the piston 10 is only pressurized when current is to flow and the device is stationary. The pressure brought to bear can be considerable to ensure an excellent electrical connection between the segments 9, which obviously could be bonded to the lower face of the ring 28 if desired, and whichever of the two rings 28 or 37 it is movable with respect to.

Figure 2:
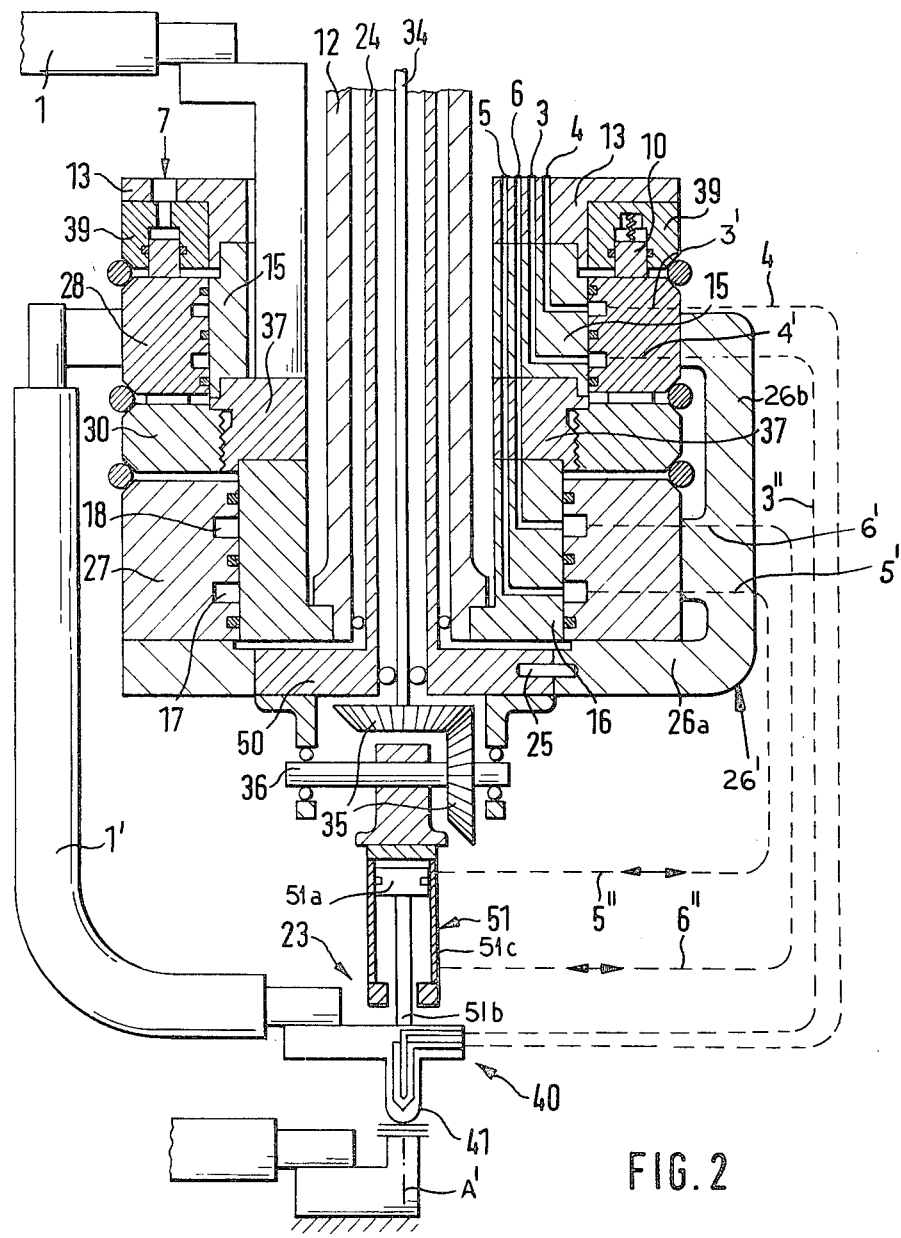
FIGS. 2 and 3 are axial sections through further embodiments of the apparatus of this invention.

FIG. 2 shows an arrangement having the above-described couplings for a coolant and a connection for a single electrical pole, but in addition has two extra connections for hydraulic or pneumatic feed and return lines.

More particularly in the arrangement of FIG. 2, where reference numerals and letters identical to those of FIG. 1 refer to functionally equivalent structure, the connector 26' has a lower portion 26a formed as a radial continuation of the flange 50 and supporting a ring 27 formed with a pair of radially inwardly open grooves 17 and 18. The connector 26' has an upwardly extending arm 26b that is connected to this ring 27, and to the ring 28 as in FIG. 1. In addition the tube shaft 12 carries a bottom guide ring 16 axially level with the extra ring 27.

The guide rings 13, 15, 37, and 27 are formed with two further passages 5 and 6 which open axially upwardly at the top ring 13 and radially from the ring 6 level with the passages 17 and 18, respectively. The grooves 17 and 18 in turn are connected to passages 5' and 6' in turned connected to flexible tubes 5" and 6" connected to the opposite compartments of a double-acting cylinder 51 having a piston 51a with a piston rod 51b that carries a welding tool 40 having a cooled electrode 41 that is connected via the tubes 3" and 4" to the passages 3', 4' and thence via the passages 3 and 4 to the source of coolant as in FIG. 1. In this manner pressurization of either of the compartments defined in the cylinder 51c by the piston 51a with simultaneous venting of the other compartment can move the electrode 41 along axis A' limitedly in either direction.

Figure 3:
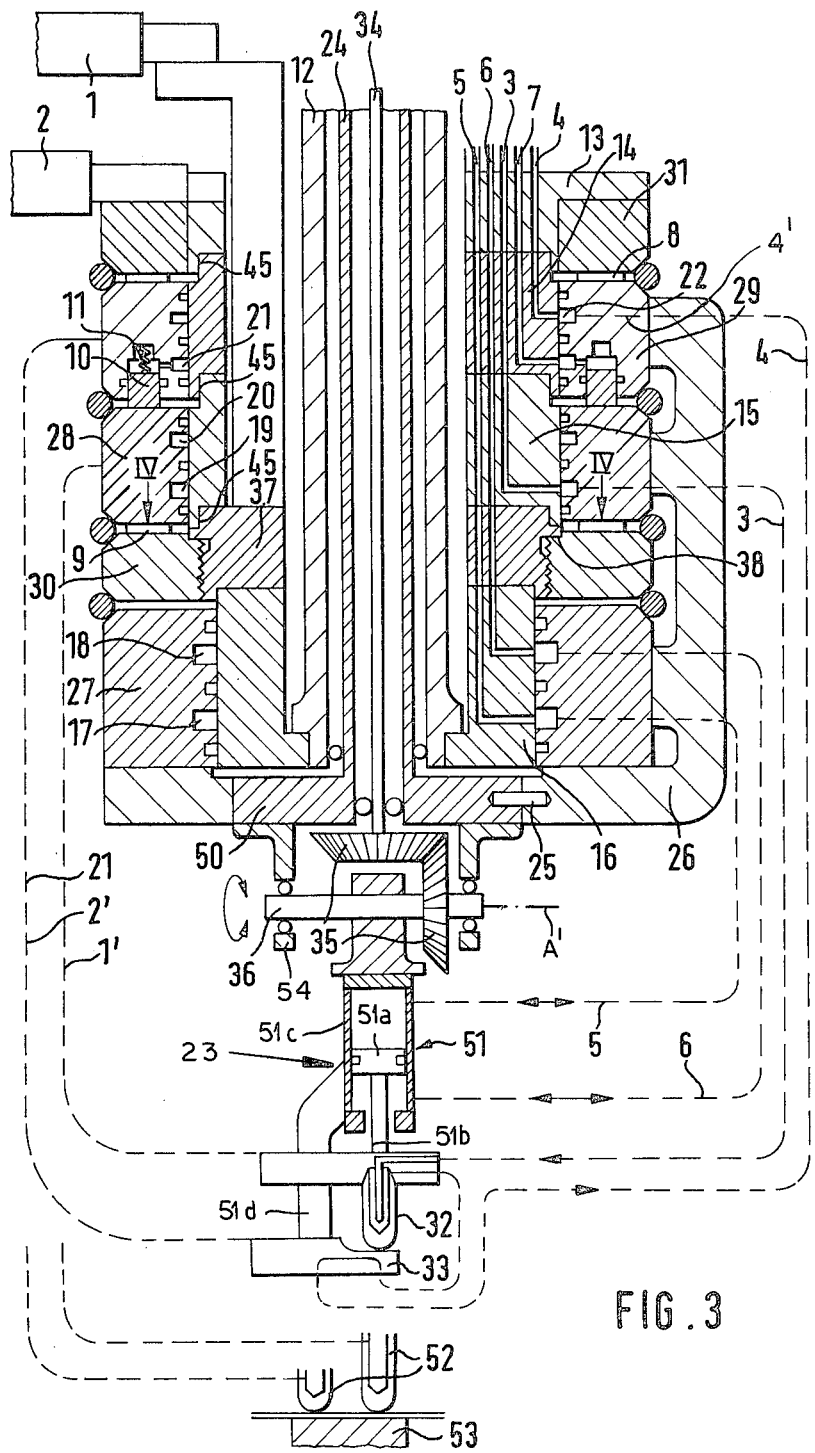

FIG. 3 shows an arrangement that is one step more complex than that of FIG. 2. Here provision is made for connection to a second electrode.

More particularly one electrode 32 is carried on the piston rod 51b and another electrode 33 is carried on an arm 51d extending downwardly from the cylinder 51c. Thus as the piston 51a slides along axis A' in its cylinder 51c it can bring the two welding tools 32 and 33 together or separate them. This is a typical pinch-weld arrangement for a robot spot welder.

The tool 32 is connected via the line 1' to the ring 28 as in FIG. 1. The device here is equipped with a second current-conducting ring 29 above the ring 28. Secured underneath the ring 13, but insulated from it, is another ring 31 and the piston 10 is provided in the ring 29, bearing axially downwardly on the top of the ring 28. Further contact segments 8 are provided on the lower face of the ring 31 to which the second electric feed cable 2 is connected directly. The piston 10 is constructed as described above of aluminum with a hard insulating coating, e.g. an anodized finish, so that it does not form a conductive bridge between the rings 28 and 29.

In addition the system is provided with another guide ring 14 between the ring 13 and the ring 15. The rings 13, 14, and 15 are formed with the passages 3-6 described above, and with the passage 7 that here opens radially in the ring 14 level with a radially inwardly open groove 21 connected to the compartment 39a behind the annular piston 10 in the ring 29. Another such groove 22 in the ring 29 opens level with the end of the passage 4, and the passage 4' is here partially formed in the ring 29. The passage 3 opens into the groove 19 and the groove 20 is not used.

In this arrangement cylinder 39a behind the piston 10 can be pressurized via the passage 7 to press the two rings 28 and 29 apart and into contact with the respective segments 9 and 8. This ensures excellent contact between the rings 30 and 31 and the rings 28 and 29, thereby connecting the cables 1 and 2 firmly to the electrodes 32 and 33.

It would also be possible in this arrangement to replace the two electrodes 32 and 33 with electrodes 52 pressing a workpiece W against a conductive support 53.

Figure 4:
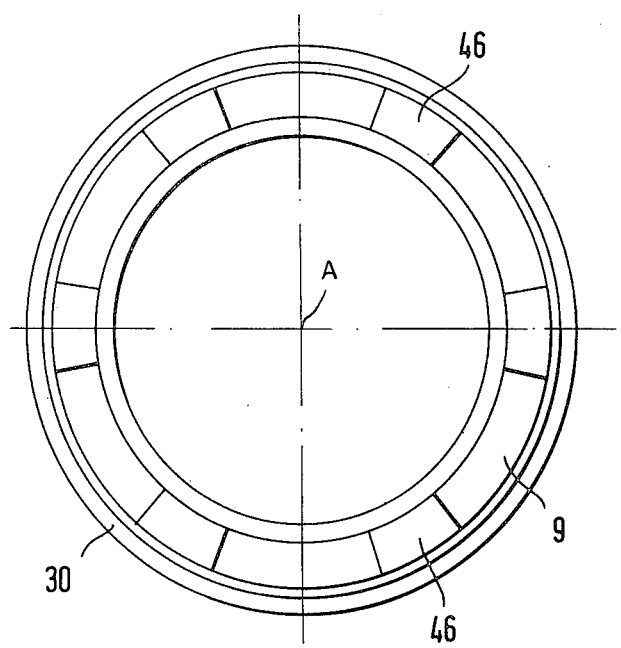
FIG. 4 is a cross section taken along line IV—IV of FIG. 3.

FIG. 4 shows how the segments 9 are separated by gaps 46. In this manner any foreign matter that comes between the segments 9 and the surfaces 3 will inherently be swept into these gaps and will not score the segments. A good electrical contact at all times is thus ensured along with a long service life for the equipment.

The system therefore allows the tool to revolve at will about the axis A relative to the support without in any way interfering with the electrical and fluid connections. The system can furthermore be easily adapted by use of the necessary connector rings to connect up any normally desired amount of electrical and fluid connections.

I claim:

1. A tool holder for a manipulator, said holder comprising:

a tool shaft extending along and rotatable about a main axis and having a tool-shaft end provided with a pivot defining a transverse axis;

a tool carried on said pivot and displaceable relative to said tool shaft about said transverse axis;

a support adjacent said tool;

a stack of guide rings coaxially surrounding said tool shaft adjacent said pivot, rotationally fixed on said tool shaft, and formed with at least two throughgoing guide-ring passages each having a radially outwardly opening passage end, two of said guide rings defining a pair of axially spaced annular confronting guide-ring surfaces;

a connector ring rotatable on said stack between said guide-ring surfaces at the outwardly opening ends of said guide-ring passages and having one axially directed connector-ring surface axially directly confronting one of said guide-ring surfaces and an oppositely axially directed connector-ring surface axially directly confronting the other of said guide-ring surfaces, said connector ring being formed with respective radially inwardly open grooves confronting the opening into said outwardly opening ends of said guide-ring passages;

means including respective fluid lines connected between said grooves and said tool for feeding a fluid from said passages through said tool;

connector means for securing said connector ring to said tool-shaft end for joint rotation of same about said main axis;

an electrical conductor connected to the guide ring of said one guide-ring surface;

a flat contact element secured to one of said one surfaces and axially flatly engageable with the other of said one surfaces, whereby current can be transmitted between said connector ring and said guide ring of said one guide-ring surface by said contact element;

means including a piston-and-cylinder assembly and a spring engaged between said connector ring and the other of said guide-ring surfaces for pressing said one surfaces and contact element together axially; and means including an electrical line connected between said connector ring and said tool for feeding electricity through said connector ring to said tool.

2. The holder defined in claim 1 wherein said guide rings are formed with complementary coaxially centered formations fitting into one another, whereby said stack forms a tube around said tool shaft.

3. The holder defined in claim 1 wherein said piston-and-cylinder arrangement includes an axially displaceable annular piston centered on said main axis.

4. The holder defined in claim 1 wherein said tool requires two electrical feeds, said holder further comprising:

a second such connector ring axially sandwiched with the first-mentioned connector ring between said guide-ring surfaces;

a second such flat contact element between the guide ring of the other of said one guide-ring surfaces and the confronting surface of said second such connector ring and secured to one of same;

A second such electrical conductor connected to said guide ring of said other guide-ring surface and a second such electrical line connected between said second connector ring and said tool; and a second such connector means for securing said second connector ring to said tool-shaft end of joint rotation with same about said main axis.

5. The holder defined in claim 4 wherein said piston-and-cylinder assembly is braced axially between said connector rings.

6. The holder defined in claim 1 wherein said flat contact element is formed by an annulus of angularly spaced conductive contact segments separated by axially open gaps, whereby foreign matter will be scraped from said contact segments into said gaps.

7. The holder defined in claim 1 wherein said contact element is at least one terminal-sliver plate having a planar face and soldered to said one of said one surfaces.

8. The holder defined in claim 1 wherein at least some of said guide rings are of light metal with hard insulating coatings.

9. The holder defined in claim 1 wherein said guide ring of said one guide-ring surface has inner and outer parts interengaging each other by a screwthread for limited axial displacement of said outer part on said inner part.

10. The holder defined in claim 1 wherein said tool requires two fluid feeds, said holder further comprising:

a second such connector ring axially sandwiched with the first-mentioned connector ring between said guide-ring surfaces, said stack being formed with another two throughgoing guide-ring passages each having a passage end opening radially outwardly level with said second connector ring, said second connector ring being formed with connector-ring passages radially aligned with said other two guide-ring passages;

a second such connector means for securing said second connector ring to said tool-shaft end for joint rotation with same about said main axis; and means including fluid lines connected between all four of said connector-ring passages and said tool for feeding respective fluids through said connector rings to said tool.

11. The holder defined in claim 1 wherein said one surfaces are axially spaced and have chamfered outer edges, said holder further comprising an O-ring engaging radially inwardly against said chamfered edges.

12. The holder defined in claim 1 wherein said piston-and-cylinder arrangement includes an annular cylinder ring secured to the guide ring of said other guide-ring surface and forming said other guide-ring surface and an annular piston axially displaceable in said cylinder ring.

13. The holder defined in claim 1 wherein said support is a tube shaft coaxially surrounding said tool shaft.

14. A tool holder for a manipulator, said holding comprising:

a tool shaft extending along and rotatable about a main axis and having a tool-shaft end provided with a pivot defining a transverse axis;

a tool carried on said pivot and displaceable relative to said tool shaft about said transverse axis;

a support adjacent said tool;

a stock of guide rings coaxially surrounding said tool shaft adjacent said pivot, rotationally fixed on said tool shaft, and formed with at least two throughgoing guide-ring passages each having a radially outwardly opening passage end, said passage ends being spaced axially from each other, two of said guide rings defining a pair of axially spaced annular confronting guide-ring surfaces;

a connector ring rotatable on said stack between said guide-ring surfaces at the outwardly opening ends of said guide-ring passages and having a pair of axially oppositely directed connector-ring surfaces one of which axially directly confronts one of said guide-ring surfaces, said connector ring being axially level with said passage ends and being formed with connector-ring passages radially aligned therewith;

connector means for securing said connector ring to said tool-shaft end for joint rotation of same about said main axis;

an electrical conductor connected to the guide ring of said one guide-ring surface;

a flat contact element secured to one of said one surfaces and axially flatly engageable with the other of said one surfaces, whereby current can be transmitted between said connector ring and said guide ring of said one guide-ring surface by said contact element;

means including a piston-and-cylinder assembly and a spring engaged between said connector ring and the other of said guide-ring surfaces for pressing said one surfaces and contact element together axially; and means including fluid lines connected between said connector-ring passages and said tool and an electrical line connected between said connector ring and said tool for feeding fluid and electricity through said connector ring to said tool.

* * * * *